H. A. GILBERT.
CONDUIT OUTLET.
APPLICATION FILED JUNE 24, 1909.

949,628.

Patented Feb. 15, 1910.

Witnesses:
C. A. Jarvis.
Mabel Dittenhoefer

Inventor:
Harold A. Gilbert
by Chrystie and Wright
attorneys.

UNITED STATES PATENT OFFICE.

HAROLD A. GILBERT, OF NEW YORK, N. Y.

CONDUIT-OUTLET.

949,628.  Specification of Letters Patent.  Patented Feb. 15, 1910.

Application filed June 24, 1909. Serial No. 504,053.

*To all whom it may concern:*

Be it known that I, HAROLD A. GILBERT, a citizen of the United States, residing at Brooklyn, in the county of Kings, city and State of New York, have invented certain new and useful Improvements in Conduit-Outlets, of which the following is a clear, full, and exact description.

The object of this invention is to simplify and improve the outlet end of ordinary conduits for interior or other wiring, to eliminate the necessity of using outlet boxes or condulets at the outlet from the main conduit.

In carrying out my invention, I provide an insulated plug, preferably of fiber which is adapted to be secured in place by the outlet nut or bushing, which is generally placed at the end of a conduit to protect the wires from the sharp edges thereof. This plug of insulation is provided with one or more holes, as may be desired, which will depend of course, upon the number of wires it is desired to bring into a room from a given conduit.

The scope of my invention will be pointed out in the claims.

Figure 1:
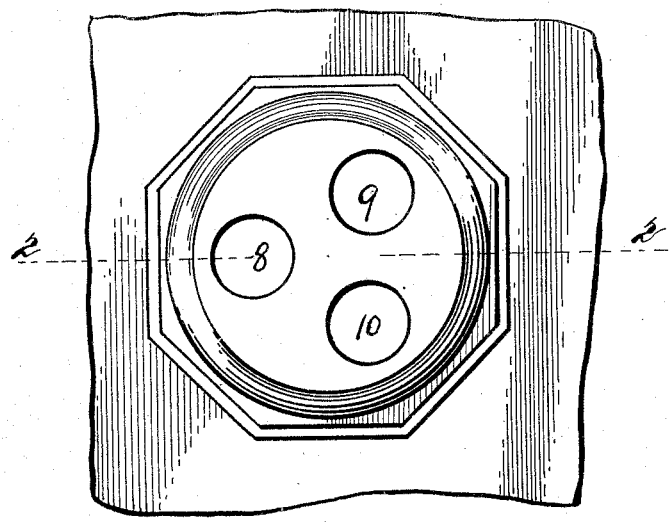
Figure 2:
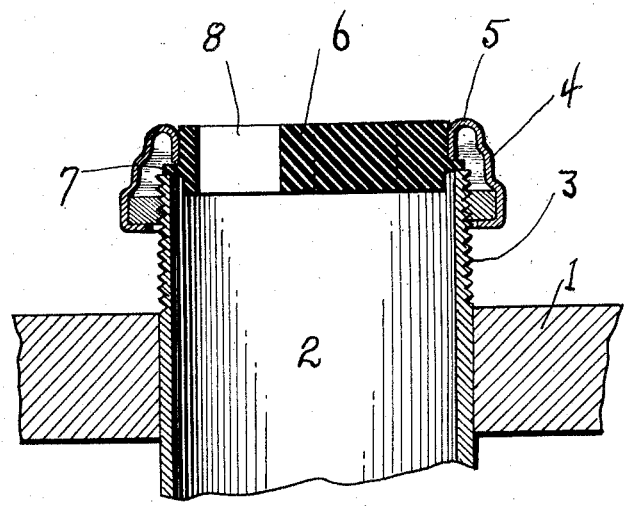

In the accompanying drawings, Figure 1 is a plan view of a conduit equipped with my invention. Fig. 2 is a section on line 2—2 of Fig. 1.

In the drawings, the floor is represented by the reference numeral 1; the pipe or conduit 2 is provided with the usual threaded end 3, a bushing 4 of the hexagonal nut type with a curve or rounded edge 5, is provided for the end of the conduit, the insulating plug 6 is provided with an annular rim 7, at a slight distance from each of the surfaces of the plug. The plug is provided with a perimeter of such shape and contour that it will fit the opening in the outlet bushing 4. Holes 8, 9 and 10, three in number in the present instance, are shown, for the outlet of the wires although the number of holes may obviously be varied. The outstanding rim 7 of the plug is located as shown in the drawings, preferably for the purpose of providing a depending insulating part within the piping to make it practically impossible for any wiring to come in contact with the pipe near its outer end.

The use of this device will be obvious to one skilled in the art in view of the statement in the fore part of the specification.

I would call attention to the fact that the nut or bushing 4 can be secured in place by threading without rotating the bushing, so that the wires may be brought through the plug, and the bushing inserted without turning or twisting the wires or plug.

I claim as my invention:

1. The combination with an exteriorly threaded outlet conduit, and its interiorly threaded bushing having a lip overhanging the end of the conduit, an apertured plug of insulation loosely fitting within the bushing and means for securing the same in place upon and by the threading of the bushing into place.

2. In combination with an outlet bushing and conduit, an apertured plug of insulation loosely fitting within the orifice from the bushing, and provided with an extending rim adapted to fit against the end of the conduit, and against which the bushing will bear to hold the same in place.

3. In combinaion with an outlet bushing and conduit, an apertured plug of insulation fitting within the orifice from the bushing, and provided with an extending rim adapted to fit against the end of the conduit, and against which the bushing will bear to hold the same in place, said insulated plug extending below its rim into the conduit.

Signed at New York city this 21st day of June, 1909.

HAROLD A. GILBERT.

Witnesses:
F. WARREN WRIGHT,
THOMAS G. TURNER.